United States Patent
Shoham et al.

(10) Patent No.: US 6,584,451 B1
(45) Date of Patent: Jun. 24, 2003

(54) FACILITATOR FOR AGGREGATING BUYER POWER IN AN ON-LINE MARKET SYSTEM

(75) Inventors: Yoav Shoham, Palo Alto, CA (US); Greg Perry, Mountain View, CA (US); Kirk Cruikshank, Saratoga, CA (US)

(73) Assignee: Ariba, Inc., Sunnyvale, CA (US)

( * ) Notice: Subject to any disclaimer, the term of this patent is extended or adjusted under 35 U.S.C. 154(b) by 0 days.

(21) Appl. No.: 09/328,193

(22) Filed: Jun. 8, 1999

Related U.S. Application Data

(60) Provisional application No. 60/115,710, filed on Jan. 12, 1999.

(51) Int. Cl.⁷ .............................................. G06F 17/60
(52) U.S. Cl. .............................. 705/37; 705/26; 705/27
(58) Field of Search .............................. 705/26, 27, 37

(56) References Cited

U.S. PATENT DOCUMENTS

| | | | |
|---|---|---|---|
| 3,581,072 A | 5/1971 | Nymeyer ..................... 235/152 |
| 4,789,928 A | 12/1988 | Fujisaki ...................... 364/401 |
| 5,101,353 A | 3/1992 | Lupien et al. ............... 364/408 |
| 5,136,501 A | 8/1992 | Silverman et al. .......... 364/408 |
| 5,603,034 A | 2/1997 | Swanson |
| 5,615,109 A | * 3/1997 | Eder ........................... 705/35 |
| 5,689,652 A | 11/1997 | Lupien et al. ............... 395/237 |
| 5,727,165 A | 3/1998 | Ordish et al. |
| 5,745,765 A | 4/1998 | Paseman |
| 5,774,873 A | 6/1998 | Berent et al. ................ 705/26 |
| 5,794,207 A | 8/1998 | Walker et al. ............... 705/23 |
| 5,794,219 A | 8/1998 | Brown ........................ 705/37 |
| 5,799,284 A | 8/1998 | Bourquin |
| 5,812,572 A | 9/1998 | King et al. .................. 372/38 |
| 5,812,668 A | 9/1998 | Weber |
| 5,835,896 A | 11/1998 | Fisher et al. ................. 705/37 |
| 5,844,554 A | 12/1998 | Geller et al. ................. 345/333 |
| 5,845,266 A | 12/1998 | Lupien et al. ................ 705/37 |
| 5,862,223 A | 1/1999 | Walker et al. |
| 5,890,137 A | 3/1999 | Koreeda |
| 5,890,138 A | 3/1999 | Godin et al. ................. 705/26 |
| 5,905,975 A | 5/1999 | Ausubel ...................... 705/37 |
| 5,913,210 A | 6/1999 | Call |
| 5,950,001 A | 9/1999 | Hamilton et al. |
| 5,966,699 A | 10/1999 | Zandi |
| 6,014,643 A | 1/2000 | Minton |
| 6,055,518 A | 4/2000 | Franklin et al. |
| 6,085,169 A | * 7/2000 | Walker et al. ................ 705/26 |
| 6,101,484 A | * 8/2000 | Halbert et al. ............... 705/26 |
| 6,146,272 A | * 11/2000 | Walker et al. ............. 273/138.1 |
| 6,269,343 B1 | * 7/2001 | Pallakoff ..................... 705/26 |

FOREIGN PATENT DOCUMENTS

| | | | |
|---|---|---|---|
| EP | 1 077 422 | * | 2/2001 |
| WO | 01/79961 | * | 10/2001 |

OTHER PUBLICATIONS

Sairamesh et al.; "Economic Framework for Pricing and Charging in Digital Libraries," D–Lab Magazine, ISSN 1082–9873, Feb. 1996.*

(List continued on next page.)

*Primary Examiner*—Wynn W. Coggins
*Assistant Examiner*—Forest Thompson, Jr.
(74) *Attorney, Agent, or Firm*—Blakely Sokoloff Taylor & Zafman LLP

(57) ABSTRACT

The Online Buyers Club System (OBCS) is a mechanism for the online purchasing of goods and services. The mechanism is targeted at user communities consisting of a large number of small-volume buyers (the "Buyers Club"). The primary function of the mechanism is to automatically aggregate the buying power of these buyers. The present invention provides a mechanism to promote competition among vendors as well as a mechanism to incent buyers to make a purchase.

45 Claims, 14 Drawing Sheets

OTHER PUBLICATIONS

Marrinucci, Sandra; "Net proves a boon for research," Electronic Engineering Times, Sep. 22, 1997.*

Bailey et al.; "An Exploratory Study of the Emerging Role of Electronic Intermediaries," International Journal of Electronic Commerce, vol. 1, n3, p. 7–20, Spring 1997.*

Negromante, Nicholas; "Psst! Transactions," Forbes, 80th Issue, Jul. 07, 1997.*

U.S. patent application Ser. No. 60/097,933, Pallakoff, filed Aug. 1998.*

U.S. patent application Ser. No. 60/097,932, Pallakoff, filed Aug. 1998.*

Ferranti, Marc; "Electronic Commerce: Ties That Bind;" InfoWorld, vol. 19, n14, p. 59–62, Apr. 07, 1997.*

Frook, John Evan, Packaged apps give auctioneers rich new options, Internetweek, May 25, 1998, Issue 716, p 14, 4/7, p, 2 graphs, 2 pgs.

Trommer, Diane, Moai intros auction software, Electronic Buyer's News, Mar. 23, 1998, Issue 1101, p78, 1/4p, 2 pgs.

Wilder, Clinton, Auctions for business, Information Week, Mar. 16, 1998, Issue 673, p90,2/3p, 1c., 2 pgs.

Millman, Howard, Legacy data links shrink costs, Info World, Jan. 5, 1998, vol. 20, Issue 1, p51, 2p, 1 chart, 1c, 4 pgs.

Opensite Technologies Introduces Innovative Web Auction Partner Program, Business Wire p.: 08041472, Aug. 4, 1998, 3 pgs.

Mase, K, et al., Scripting method based on temporal intervals for designing interactive systems, Transactions of the Information Processing Society of Japan, May 1, 1998, vol. 39, Issue 5, p1403–13, 2 pgs.

Emaze Software offers WebThread, ScriptWizard on Buy-Direct.com, Business Wire p.: 12120089, Dec. 12, 1996, 3 pgs.

Cohen, Emily, Going . . . Going . . . Gone!(Fairmarket's Web Auction site, and Emaze Software's Emaze Auction Web auction software), PC Magazine, vol. v17, Issue n15, Sep. 1, 1998, 2 pgs.

Search Report for PCT/US00/15982; mailed Aug. 23, 2000; 6 pgs.

ONSALE; About ONSALE; Copyright 1996 ONSALE, 2 pgs.

ONSALE; Auction Formats; Copyright 1996 ONSALE, 2 pgs.

ONSALE; Auction Supersite; Copyright 1997 ONSALE, Inc.; Sep. 8, 1997, 7 pgs.

ONSALE HOME; Copyright 1997 ONSALE, Inc.; Sep. 8, 1997; 4 pgs.

Current Christmas Wishes 1991; Christmas 1991; 4 pgs.

Search Report for PCT/US00/17449, mailed Nov. 14, 2000, 4 pages.

Lal, Rajiv, et al.; An Approach For Developing An Optimal Discount Pricing Policy; Management Science, vol. 30, No. 12, Dec., 1984, pp. 1524–1539; The Institute of Management Sciences.

International Preliminary Examination Report for PCT/US00/15982; mailed May 8, 2001, 1 pg.

Search Report for PCT/US99/17248; dated Oct. 18, 1999; 4 pages.

* cited by examiner

FACILITATOR FOR AGGREGATING BUYER POWER IN AN ON-LINE MARKET SYSTEM

PRIORITY

The present patent application claims priority to the corresponding provisional patent application serial No. 60/115,710, titled, "Online Buyers Club System", filed Jan. 12, 1999.

FIELD OF THE INVENTION

The present invention relates to the use of networked computer systems for implementing an on-line trading market for the selling and purchase of goods and services

BACKGROUND OF THE INVENTION

The Internet is profoundly changing business realities. One of these profound changes is the shift in power from seller to buyer. Increasingly, buyers, whether consumers or businesses, are made aware of alternative sources of goods and services, and are able to leverage this knowledge to command better buying terms. Online comparison shopping services, such as Junglee, Jango, and mySimon, are good illustrations of this reality. Because of the availability of these well-known comparison shopping services, other services have been made available for inviting buyers to quote prices. There are several conventional services, among the best known being Priceline.com, which allow buyers to quote prices and invite sellers to accept the quote. Indeed, Priceline has been granted a patent in connection with such activity (U.S. Pat. No. 5,794,207).

A further edge is afforded to buyers by their ability to assemble into online communities of interest, and leverage this network to their commercial advantage. A straightforward way to leverage the community is through exchange of information. A more elaborate way to leverage the community is to aggregate the buying power of its members. There is already an implicit aggregation of buying power within communities. A service provider such as America Online is able to negotiate price discounts from vendors based on its very large subscriber base. The problem in such a situation is that the parties have no knowledge in advance of the actual buying volume; this limits the negotiating power of the service provider, and the willingness of the vendor to discount the price.

Thus, an apparatus is needed for facilitating the aggregation of buyer power in an on-line trading market system serving traders communicating via the Internet and similar networks.

SUMMARY OF THE INVENTION

The Online Buyers Club System (OBCS) is a mechanism for the online purchasing of goods and services. The mechanism is targeted at user communities consisting of a large number of small-volume buyers (the "Buyers Club"). The primary function of the mechanism is to automatically aggregate the buying power of these buyers. The present invention provides a mechanism to promote competition among vendors as well as a mechanism to incent buyers to make a purchase.

DETAILED DESCRIPTION OF THE PREFERRED EMBODIMENT

The present invention is a method and apparatus for facilitating the aggregation of buyer power in an on-line trading market system serving traders communicating via the Internet and similar networks. In the following detailed description, the present invention is sometimes referred to as the On-Line Buyers Club System (OBCS). Further, numerous specific details are set forth in order to provide a thorough understanding of the present invention. It will be evident, however, to one of ordinary skill in the art that the present invention may be practiced without these specific details. In other instances, well-known structures and devices are shown in block diagram form in order to avoid unnecessarily obscuring the present invention.

Figure 1:
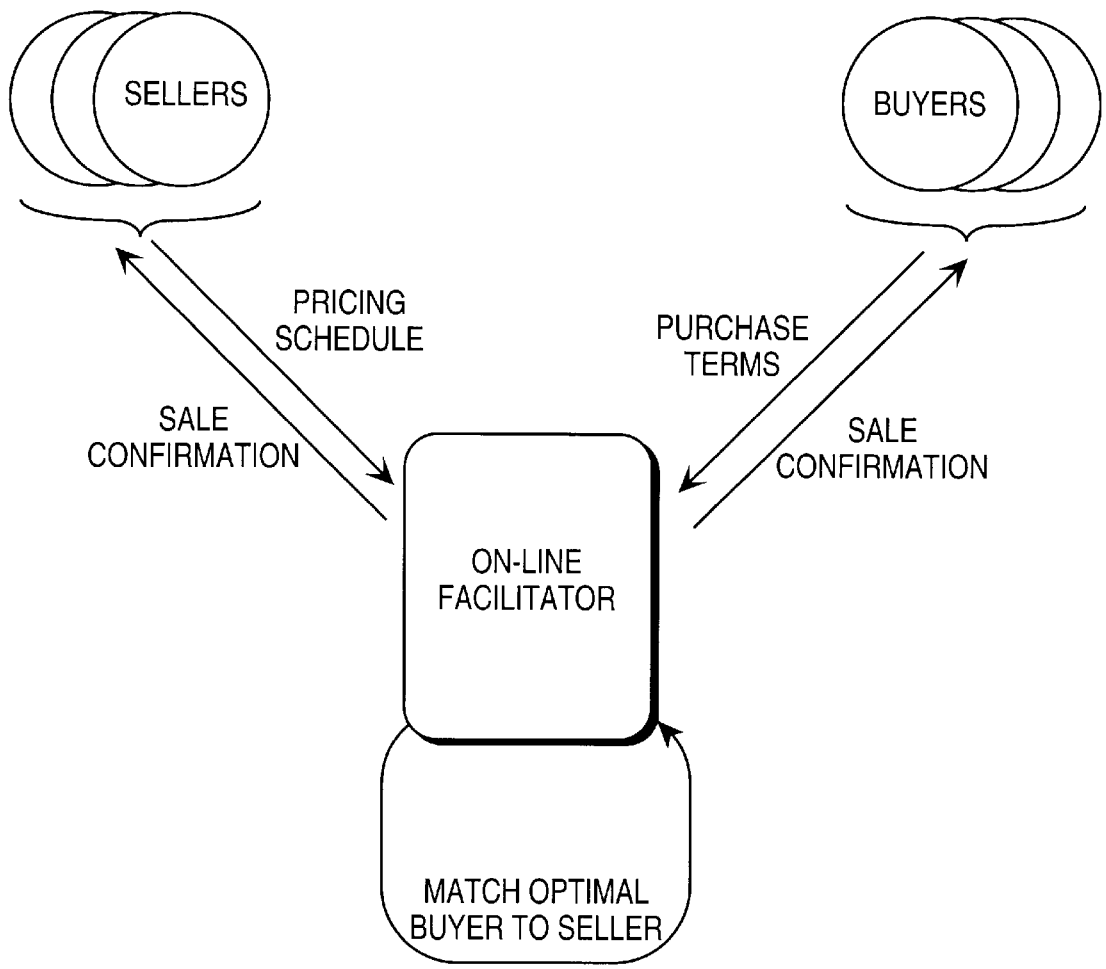
FIG. 1 is a system block diagram showing the components of the preferred embodiment.
Figure 2:
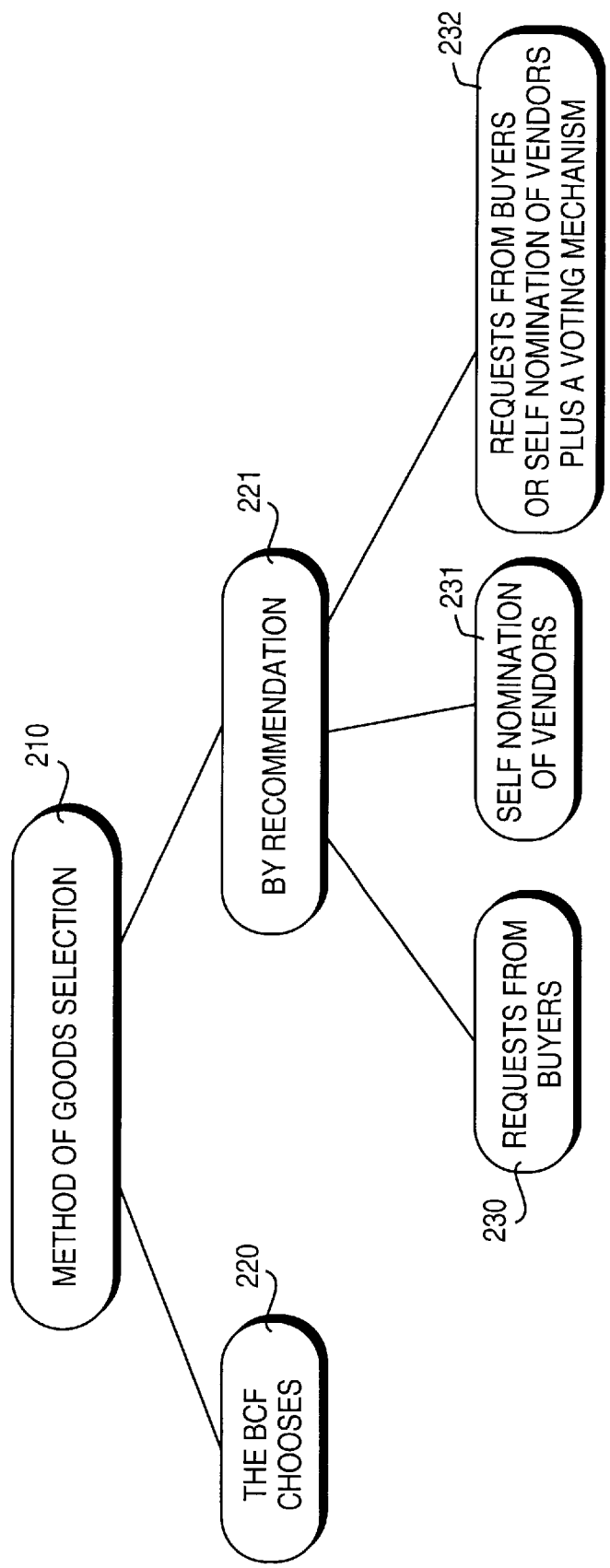
FIGS. 2–5, 6A, 6B, 7, 8A, 8B, and 9–12 illustrate a tree-structured menu of choices for setting up a sale in the Buyers Club system.
Figure 3:
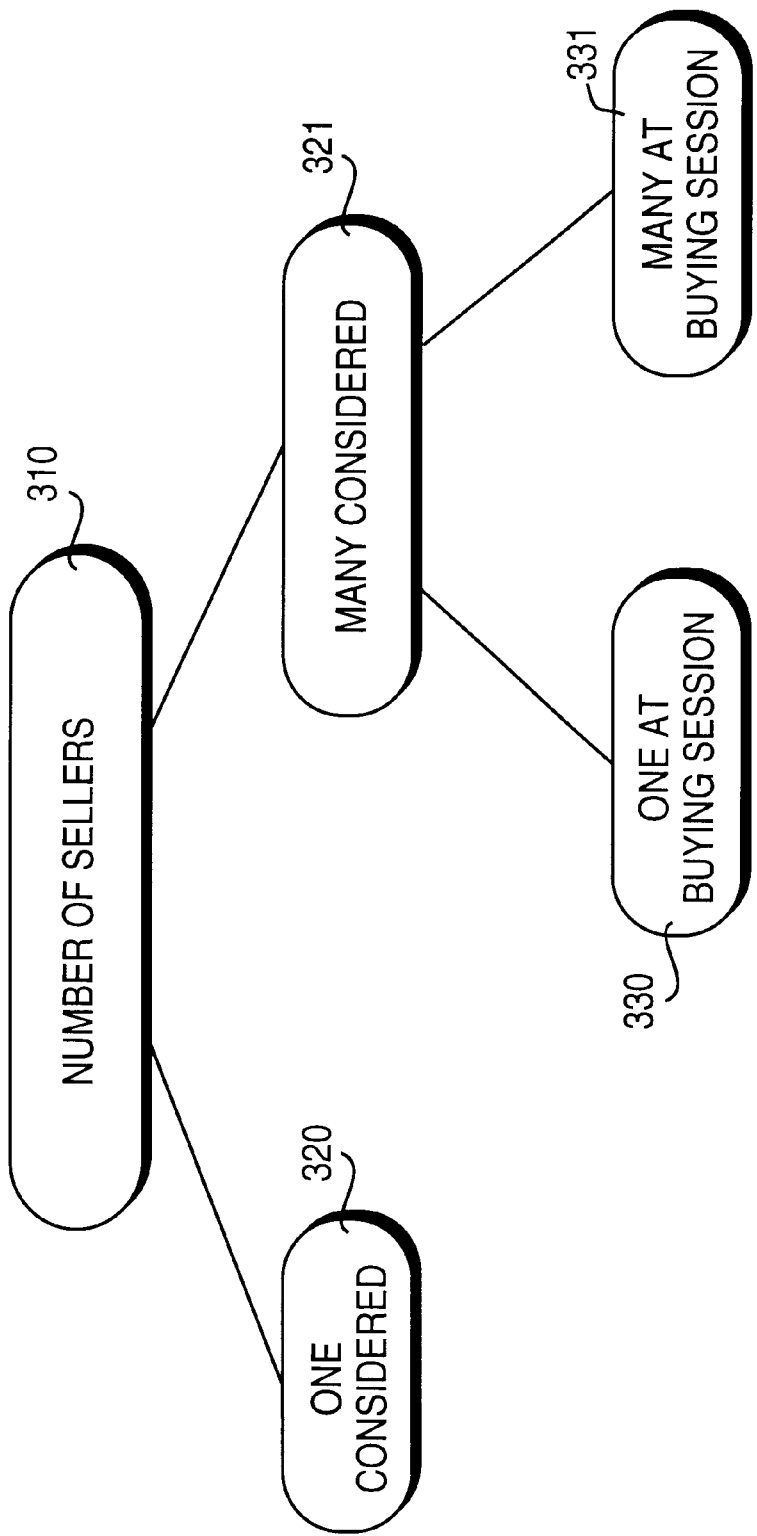
Figure 4:
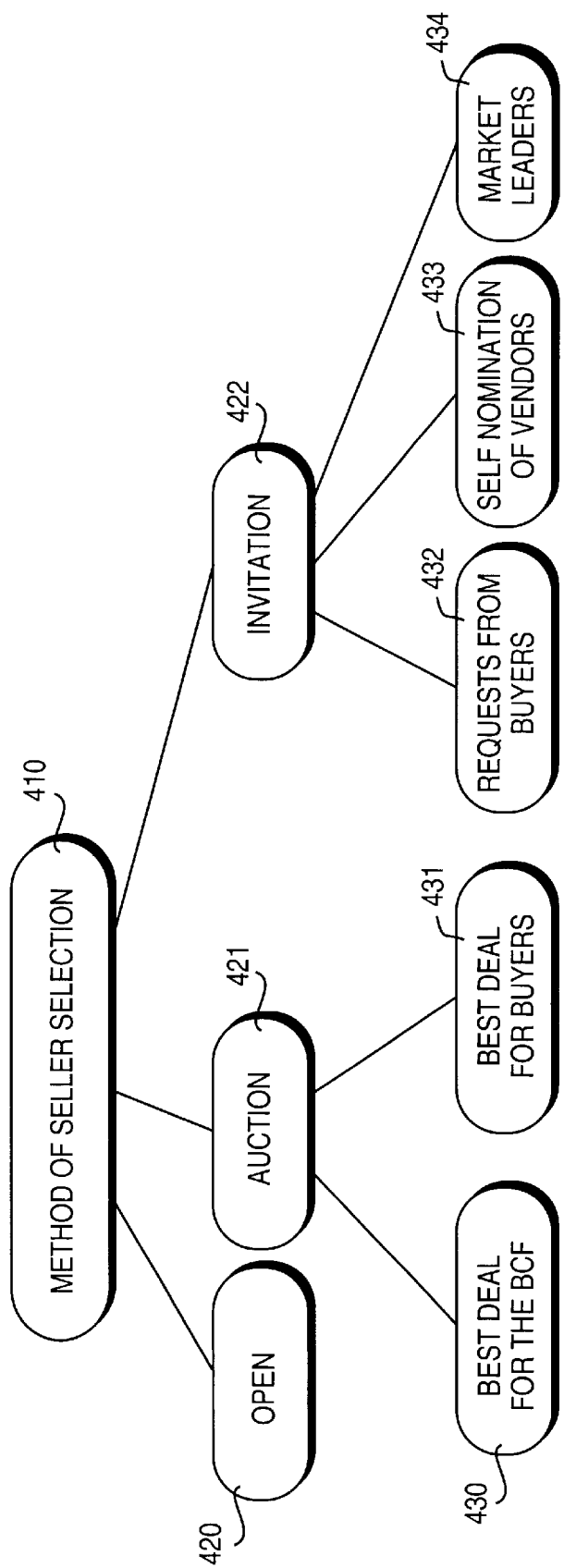
Figure 5:
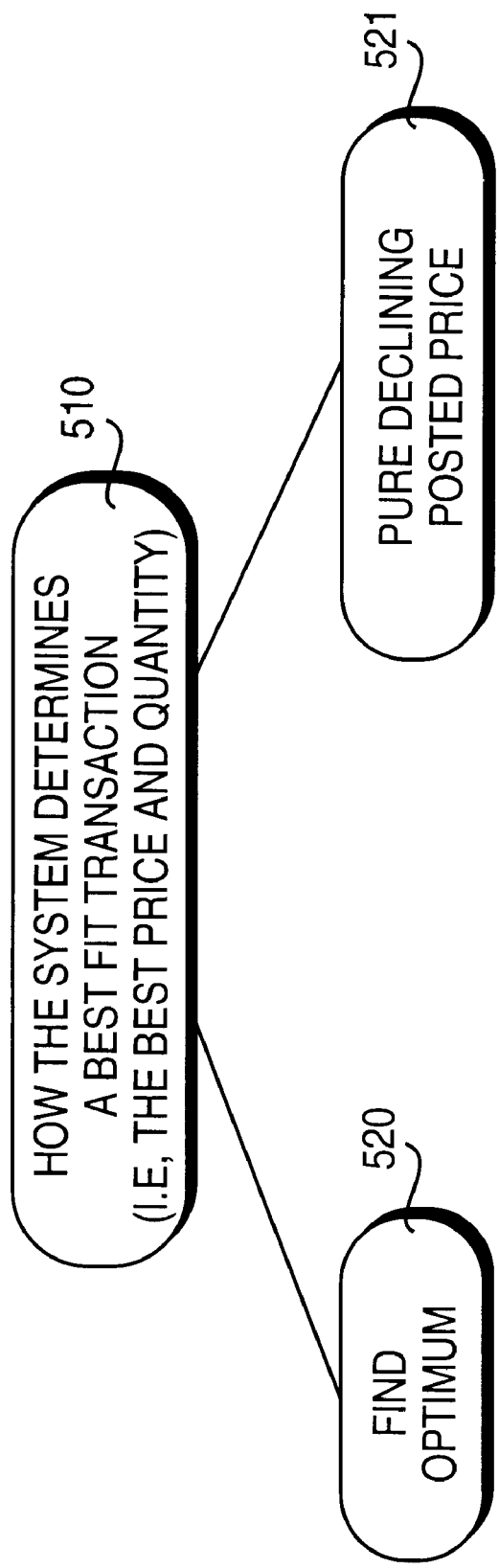
Figure 6A:
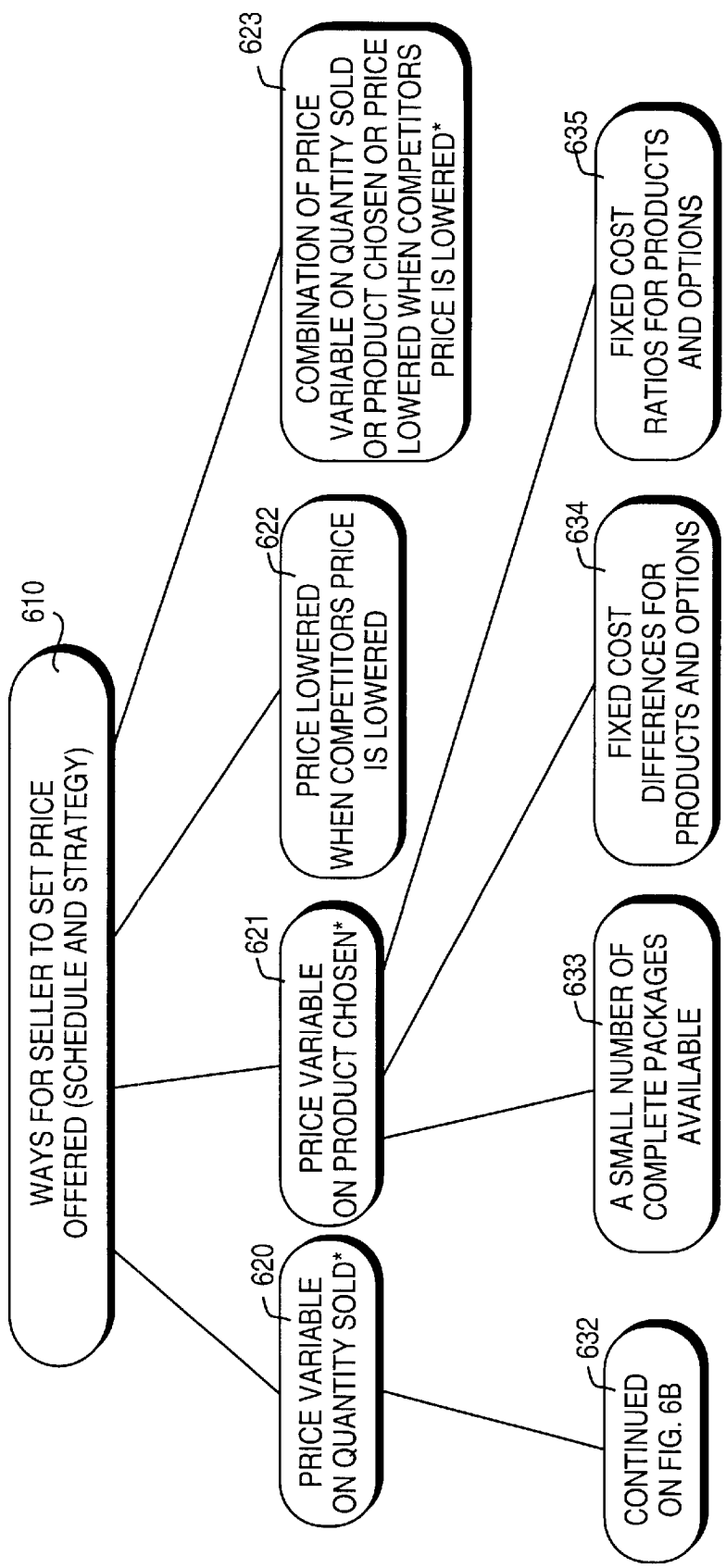
Figure 6B:
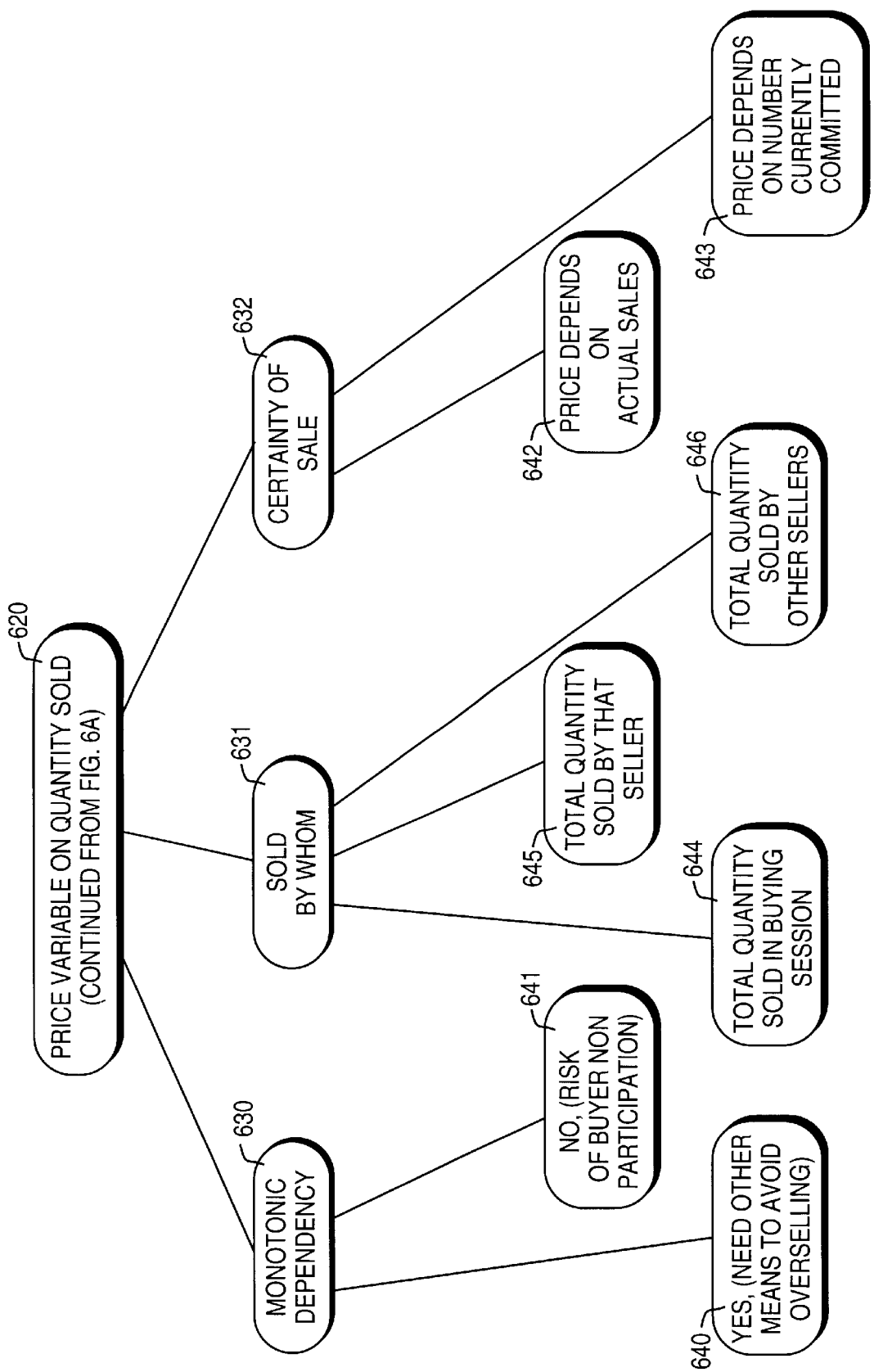
Figure 7:
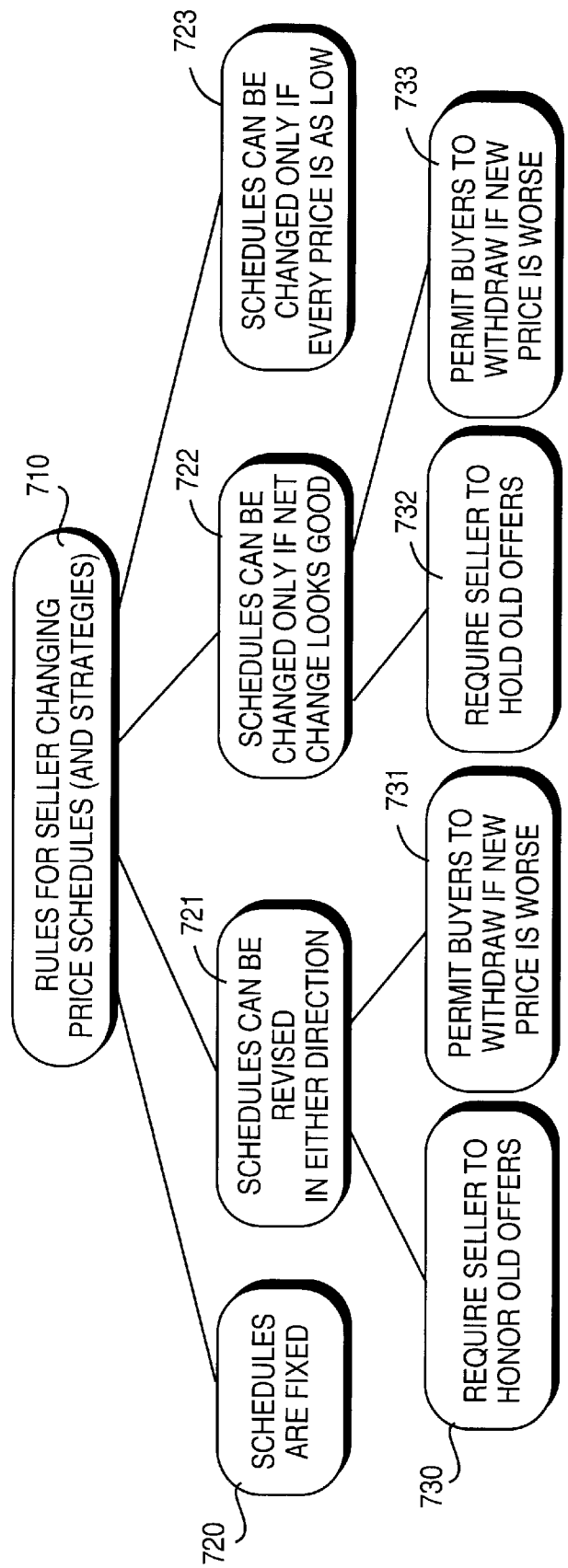
Figure 8A:
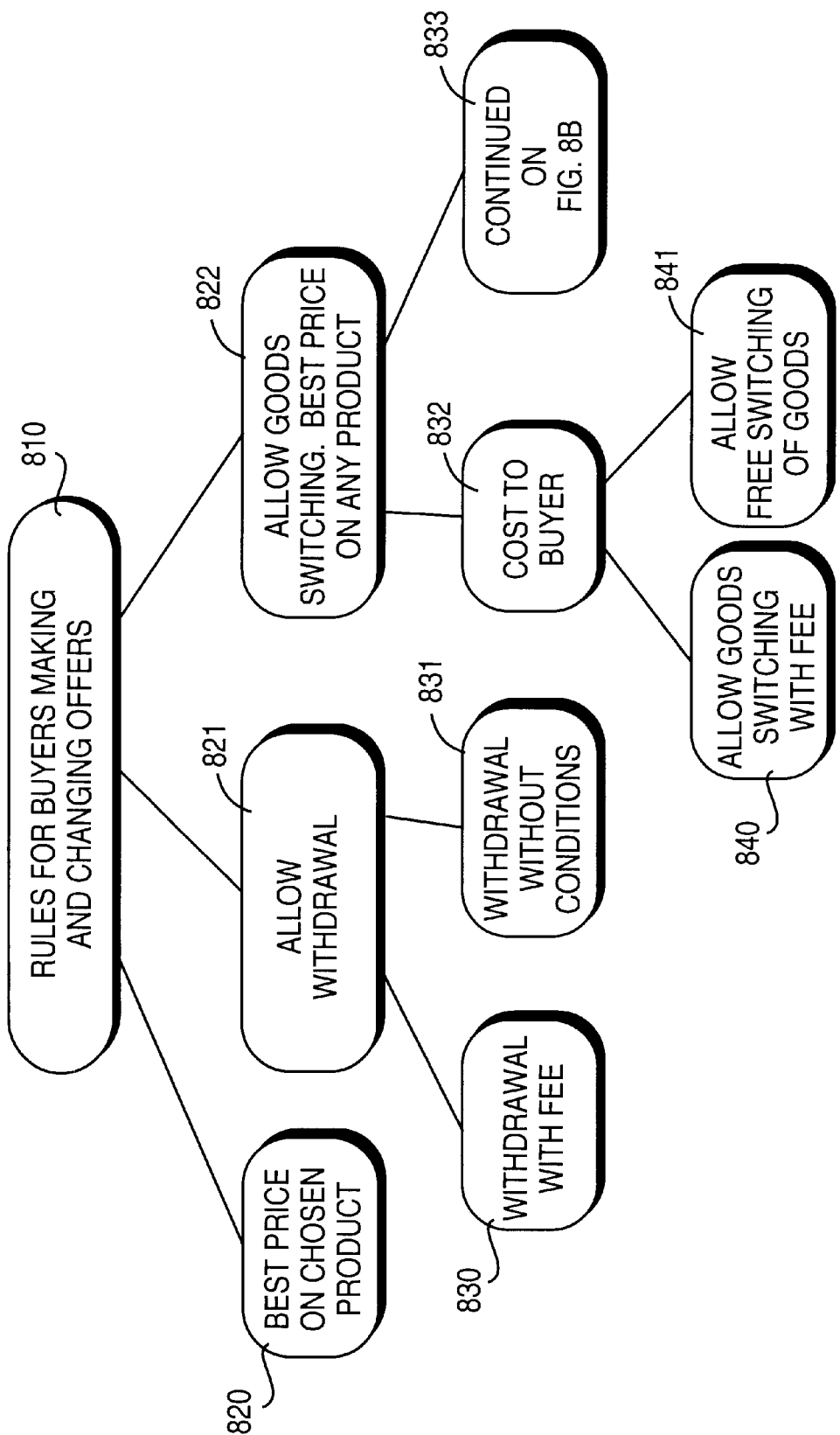
Figure 8B:
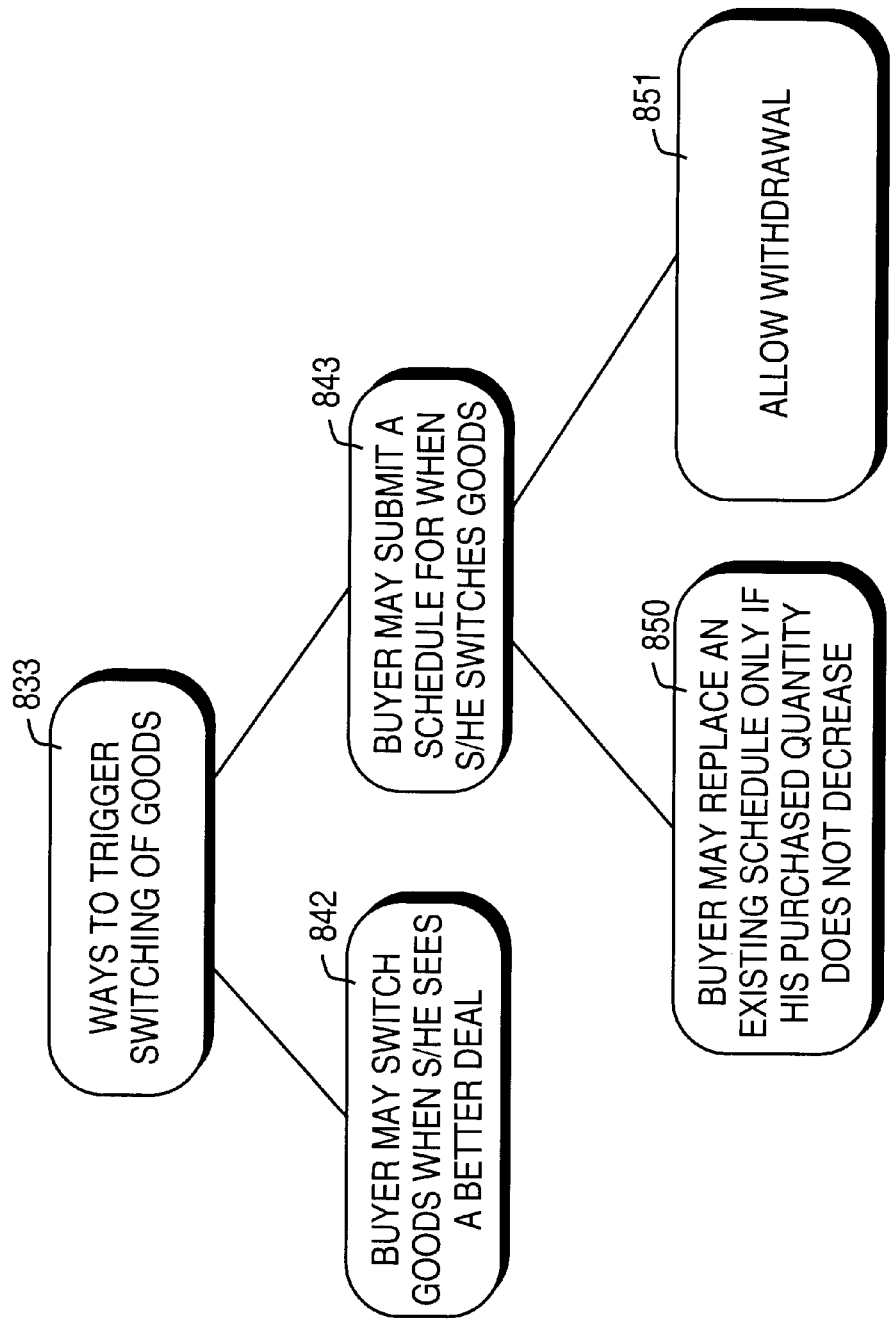
Figure 9:
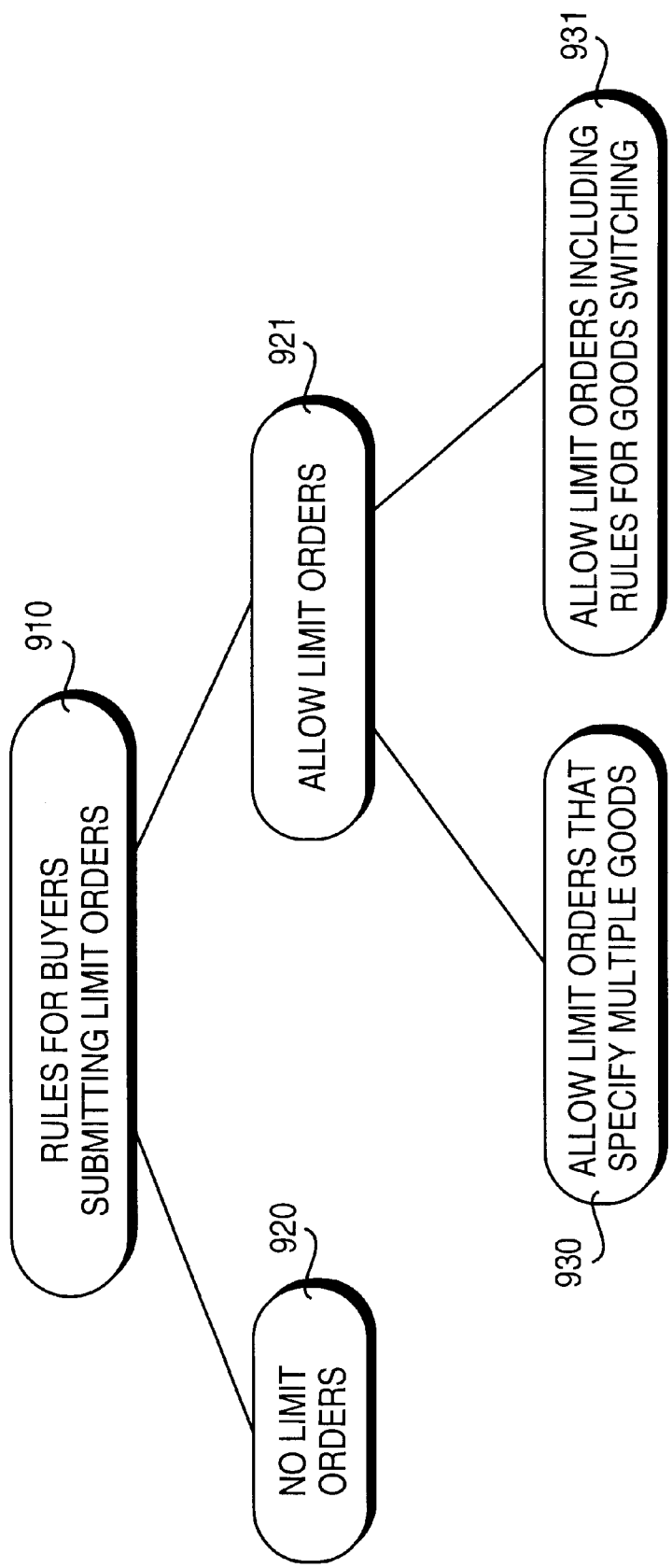
Figure 10:
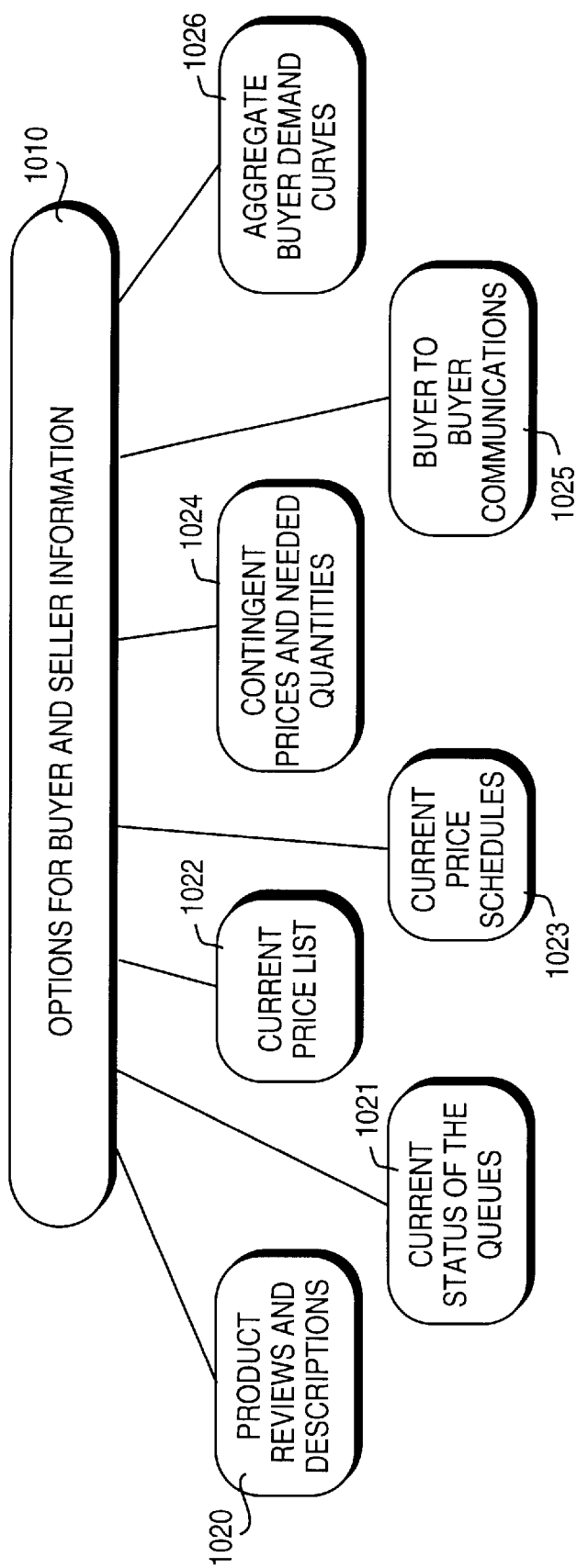
Figure 11:
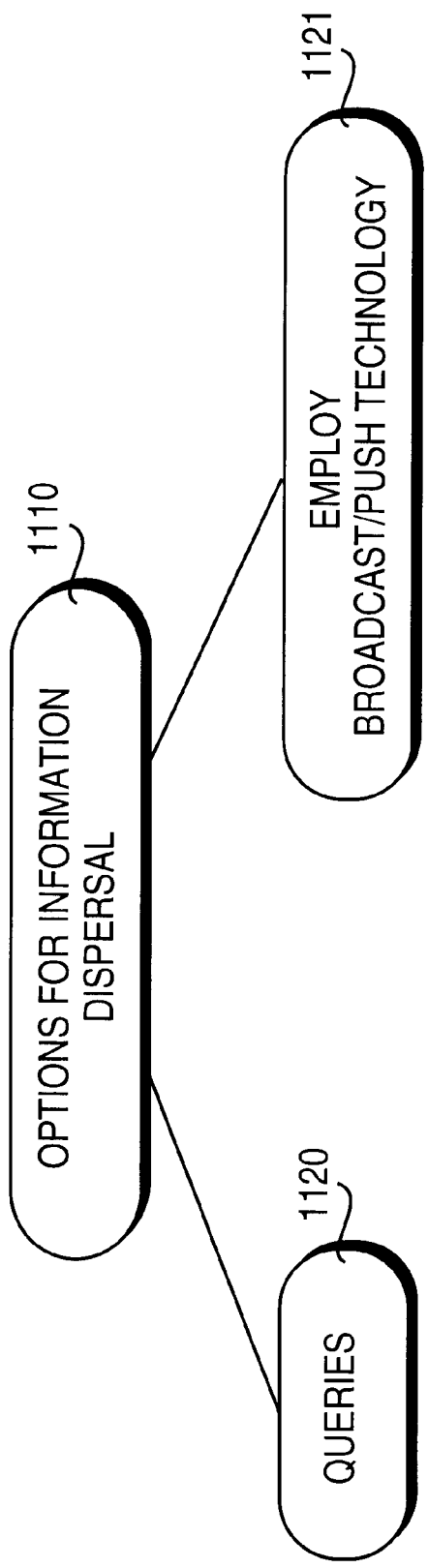
Figure 12:
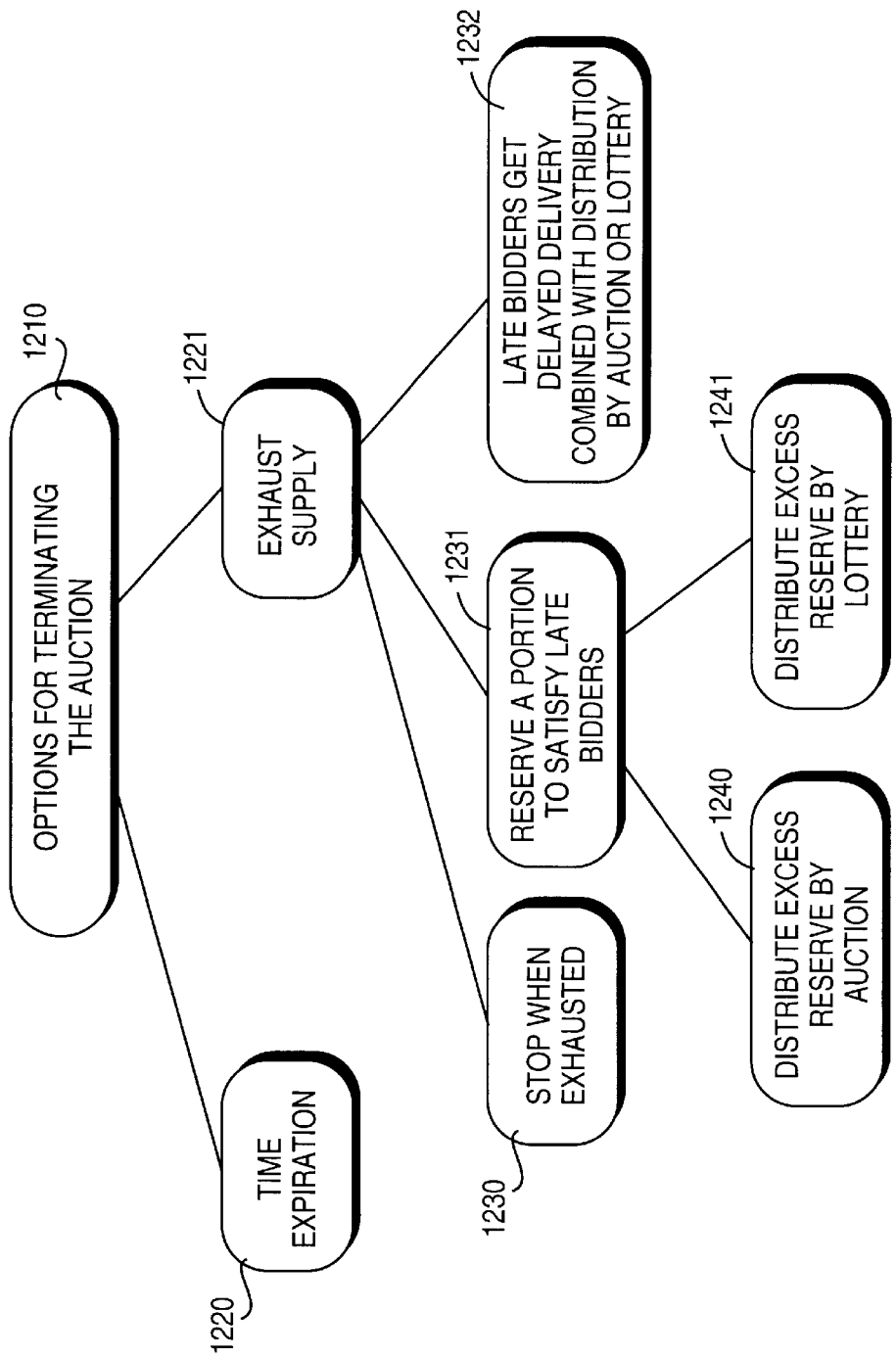

Referring to FIG. 1, the present invention includes the following primary components: 1) an on-line facilitator (referred to herein as the Buyers Club Facilitator or BCF) comprising computer and software connectable with an information network for communication with a plurality of sellers and buyers, 2) a set of sellers having goods and/or services for sale or lease to buyers, and 3) a set of buyers (referred to herein as the Buyers Club) desiring to purchase or lease a type of goods and/or services. In the present invention, the sales/purchase transaction typically occurs via the information network. Thus, proximity is not a barrier in the present system. Further, the sellers in the present system do not need to have quantified pricing for their goods and services prior to using the present invention. Other features and benefits of the present invention are set forth below.

The Benefits

The particular benefits of the mechanism to the buyers and sellers are as follows:

To Buyers Club members:
   The primary benefit is lower prices, commensurate with those that a single large-volume buyer could expect.
   A secondary value, which is manifested in some versions of the mechanism, is the ability to gauge the interest in particular items by fellow club members, update one's own value for that item, and make buying decisions based in part on this updated assessment.

To seller or sellers to the Buyers Club:
   The primary value, beside the opportunity to sell to a large set of potential buyers, is to enjoy a pricing scheme that automatically adapts to the selling volume, from single-unit sales to arbitrarily high volumes.
   A secondary value is allowing the seller to dynamically adapt prices to demand revealed by the market during the sale process, and, in some versions of the mechanism, to competitors' prices.

The Mechanism in a Nutshell

Referring again to FIG. 1, the OBCS is used by a Buyers Club facilitator, hereafter BCF, to initiate "buying sessions" (in a typical application this BCF is an online service provider). In the most basic type of buying session a single seller, SellCo, is invited by a particular BCF, OnlineCo, to sell a particular good to its members.

SellCo submits a function describing how low a price it is willing to offer, depending on the number of buyers willing to buy. This function is called a schedule, and may or may not be disclosed in advance to the buyers. Buyers then submit maximum prices at which they would buy. The system would find the largest quantity (and smallest price) at which a deal can be made, possibly as buyer bids are coming in. The seller(s) then sell the goods to all buyers who offered more than the discovered price.

In addition, SellCo may disclose the prices at which it is willing to sell, as a way of attracting interest. After an initial phase, the market would publish to buyer the additional quantity of buyers needed to achieve each price point. The disclosure of potential prices may get bids from people who are scared by the low quantity price. In addition, the knowledge that the price will drop with a few more bids gives buyers a reason to evangelize or raise their own bids to get in on the deal.

SellCo may also wish to have its prices depend on other factors, such as the rate at which buy offers are coming in. In this case, SellCo may be able to change its schedule. An automated means of doing this is called an automated strategy. Note that the special case of a fixed price schedule with a complicated automated strategy is the same as permitting the schedule to depend on more factors than just quantity.

This basic type of buying session is extended in a large number of ways. Some are straightforward—for example, a buyer can offer to buy more than one unit. Others are more complex. For example, if there is only a single seller for a kind of good as in the basic version, or alternatively a small, select set of sellers, the system offers several auction-based schemes for selecting these seller(s). Or, as another example, when multiple sellers are invited to sell competing products simultaneously, the system specifies several alternative conditions under which buyers who have committed to one seller are permitted to switch to another seller.

These and other considerations give rise to multiple versions of buying sessions, which are laid out systematically in the next sections.

The Mechanism in Detail—Narrative Description

Here we give a narrative description of the important choices faced by OnlineCo in setting up a buying session within the OBCS, including illustrative examples of considerations that impact these choices. In the next section we give the precise menu of choices.

In setting up a buying session the Buyers Club facilitator is required to make choices in the following areas:

1. What goods will be offered for trade
2. Which vendors will be qualified to, and actually, offer the goods for sale
3. How the system determines the best price and quantity
4. What are the rights and obligations of vendors in making sell offers
5. What are the rights and obligations of buyers in making buy offers
6. What information is revealed to buyers and sellers throughout the buying session
7. How the system closes a buying session What Goods will be Offered for Sale:
 Necessity of Moderation
 Which goods will be offered will necessarily be in some sense a choice of the BCF. At a minimum, there is a need for moderation to avoid misuse.
 Possibility of Automation
 Ideally, the involvement of the BCF could be kept to a minimum, particularly in the area of choosing which goods.

This requires automatically gauging interest from buyers and sellers. Inputs to this decision process could be self nomination by vendors or requests by buyers for classes of goods. These requests (by buyers or sellers) could be published to the potential buyers along with a vote gathering mechanism. Goods which gather a large number of votes and have willing sellers would then have a buying session.

Which Vendors will Offer the Goods:
 Number of Sellers
 The first choice is the number of sellers admitted to the buying session. This choice must be made both for the number of sellers to initially consider, and the number of sellers to present directly to the buyers. Inviting multiple sellers offers clear advantages for the buyer, both in terms of diversity of products offered and competition to drive down prices. Multiple sellers also results in a somewhat more complicated (and difficult to design) buying session, since rules need to be set up for when buyers may switch sellers and similar issues. Most of these issues exist even with a single seller, who has multiple products in the buying session. (In implementation, multiple goods from a single seller and multiple sellers offering multiple goods will likely look exactly the same internally.)

The other option is to have only a single seller in the buying session. This seller would submit a binding schedule for how low a price s/he would offer for various quantities of goods.

Determining Which Seller(s)
 Whether there is one seller or many, there is a need to pick which one(s). In the multiple sellers case admission could simply be open. For non-open buying sessions, sellers could be determined by accepting the sellers with the best price schedules, sellers with unusually heavily desired products, or sellers who pay the most to the BCF. The first two require the BCF to make assessments of products and price schedules, but seem fairer. The third is easy to decide and generates revenue for the BCF. For the first and third options, any of several auction mechanisms could be used to determine who has the best schedule or best payment to the BCF.

How the System Determines the Best Price and Quantity
 As the OBSC collects bid from buyers, it must determine how many goods are sold at which price. For the single seller with a monotonic schedule, this is simple. The system simply chooses the highest quantity (and associated schedule price) such that there are enough willing buyers to receive the quantity at that price.

If a buyer is unwilling to submit prices (and credit card numbers) without knowing that s/he will receive the goods, the buyer may wait until enough other buyers bid to lower the price to an agreeable level. If all buyers do this, either by individual decision or by OBCS design, the system becomes one of a pure declining posted price. As each buyer sees the price drop below his/her threshold, s/he will submit a bid for the good, possibly further lowering the posted price.

This declining posted price feature is shared with the original exposition, with the key difference being that the original description allows the OBCS to accept and member potential buyers who are willing to buy only if the price drops further. In addition, the OBCS can recognize when enough potential buyers exist to force the price down purely on the volume of the potential buyers.

For multiple sellers, there is not necessarily a unique highest quantity. (Is a sale of 300 Fords and 7 Cadillacs as good as a sale of 100 Fords and 150 Cadillacs?) If the buyers are required to submit a bid on only one good, there is no difficulty—the maximum quantity of Fords is independent of the maximum quantity of Cadillacs, and both are determined as before.

If a buyer can submit a bid that is for either X or Y depending on price, the situation gets complicated. Essentially, bidders get put into either the queue expected to buy X or the queue expected to buy Y. As the relative prices change, bidders move from one queue to the other. This is called "Switching Goods". This is the same for the original mechanism or for the pure declining posted price mechanism. The quantities and prices of the sale are determined by the quantities in each queue at the end of the auction. (See Switching Goods and Final Quantity Schedules.)

What are the Rights and Obligations of Vendors in Setting Prices:

Seller Schedules

The underlying concept of the OBCS is to aggregate buying power to negotiate a volume discount. The immediate problem, solved by the OBCS, is that the actual volume is not known until after the buying session. This problem is solved by allowing a seller to submit a schedule to describe how far s/he is willing to drop his price in return for higher volume. This allows a seller to offer volume discounts without knowing in advance exactly what the volume will be. More generally, a seller's schedule, combined with his automated strategy, is whatever function determines the seller's price. This function could depend on the quantity committed to that seller or others, the particular products and options involved, the prices of competitors, and/or a new schedule submitted for other reasons.

As a function of quantity, the seller's price will generally decrease. (though this may not be required by all OBCS. If sellers can raise prices during an auction, then other options in the auction design are restricted. And conversely. See Price Non-Monotonicity.) This leaves open which quantity is meant. Quantity could mean the total volume of sales in the buying session, the volume of sales for that vendor, or the volume of sales for the vendor's competitors. The BCF needs to determine which of these to support (possibly all).

Within each of these, there is the problem that the final quantity is not yet known. If sales volume increases as more buyers come in, and if price schedules are monotonically decreasing, this is not a problem. The price goes down, so every buyer gets at least as good a deal as s/he was promised, and the seller gets to sell a large volume at a price s/he declared. However, if the volume goes down, either by withdrawals of bids or buyers switching to other sellers' goods, then the price given by the schedule could be higher than the price quoted. (In practice, withdrawals will likely be forbidden, and other restrictions imposed to address this issue. See Switching Goods and Final Quantity Schedules.)

Seller Schedules for Multiple Products

Schedules for multiple products and options from the same seller are straightforward, but should include some way for the seller to lower the prices on his overall product line in concert, to keep relative incentives in order. This could be done by keeping separate schedules, fixing the absolute price differences among products, or fixing the price ratios between products.

Schedule Dependencies on Competitors Prices

Lowering price due to a lowering of competitors price is clear.

Submission of New Schedules

Sellers may wish to submit a new schedule entirely. Since committed buyers and current shoppers expect that they will be able to make purchases based on the quoted price, sellers should not be able to submit arbitrary new schedules effective immediately and retroactively. One option is to require that the new schedule offer better deals than the old. Better could mean all price points are as low or lower (not all equal) or that overall it looks like a better deal. (The "better overall" option is fuzzy and probably unworkable.) Another is to delay the new schedule by an hour and let everyone committed under the old schedule keep their deals.

What are the Rights and Obligation of Buyers in Making Offers:

Grant Early Buyers Late Prices

In order to encourage potential buyers to bid early, everyone can be granted the price based on the total volume in the buying session. (As noted before, there exist multiple meaningful interpretations of "volume".) That way, each bidder knows that s/he can do no better by waiting, and should bid whenever the price is acceptable. S/he is guaranteed the best price on that product in that buying session.

Withdrawals

The buyer may decide s/he wishes s/he had not submitted his bid, and wish to withdraw it. While this option reduces the risk for buyers, it also undermines the credibility of the market, since sellers are asked to offer volume discounts without any real commitment from buyers. If buyer commitments are perceived as flaky, sellers may not be willing to seriously participate in the presence of easy withdrawals. One possibility is to charge a fee for withdrawing a bid. Another approach, likely to be more common in practice, is to simply not allow withdrawals.

Switching Goods

If multiple vendors or products are offered, it is likely that a buyer who bid on item A may later see a better price on item B. If buyers are not allowed to switch to better offers, there is again a disincentive for buyers to bid early, with the same problems as before. Permitting the buyer to choose the newly lower priced good is here called allowing "Switching Goods". The goods may or may not be provided by different vendors.

In extreme situations, arbitrary switching of goods without penalty is the same as withdrawal, since a buyer could exchange his/her high value bid with an extremely low value bid. However, in a typical case the BCF will need to group goods for ease of use anyway, this is avoided by only allowing switching goods within the stated group.

Another way to control switching goods and withdrawals is the charge a fee for each. This is still a cost imposed on those who commit early, and thus again discourages bidding, so users of the system are advised to use this feature with caution.

Given that switching goods is permitted, there are different ways for a customer to specify when s/he is willing to switch goods. The buyer might have to watch the market and make decisions by submitting a new (replacement) bid. Another alternative is to allow the buyer to submit the equivalent of a schedule: "buy product A unless product B is 40 dollars less. In that case, buy product B". when buyers submit schedules, replacing the schedule should require that the new schedule also result in the same number of purchases. (If the buyer were permitted to replace her/his schedule with an arbitrary schedule, s/he could effectively withdraw her/his bid by offering to pay only an extremely low bid.)

Limit Orders

Limit orders are bids that are contingent on a price which may not yet have been achieved. For example: "Buy product A if the price drops below $300." In the original mechanism, all bids are thought of as limit orders. In the pure declining posted price mechanism, limit orders are an optional extension.

Limit orders may also include goods switching rules: "Buy product A if the price on A is below $300, or B if the price on B is below $400. If both are satisfied, buy A if its price is no more than 75% of the price on B, else buy B." Limit Orders could also have time expirations.

Switching Goods and Final Quantity Schedules

If a seller's price schedule depends on the final quantity s/he sells, and buyers are able to decommit themselves from that seller, posted prices are less meaningful. The reason is that early bidders could switch to another seller's goods, and by doing so lower the final number committed and thus raise the price. The new price is above the price offered to late bidders, who may be unwilling to pay the extra. Ways to solve this include:

- Require the seller to honor his old prices to those who were committed.
- Don't allow sellers to raise prices as quantities fall. (think of prices as ratcheted.)
- Permit buyers to withdraw for free if seller raises prices above initial commitment level.
- (If limit orders are permitted, the buy bid could automatically become a limit order.)

The first two require some level of controls to prevent abuse of the OBCS. Vendor A might submit a huge order to vendor B, in order to drive B's price down. Then Vendor A could switch that order to itself. However, if buyers (or sellers) are paying a small fee per cleared unit bid, such tactics are probably too expensive to contemplate.

Price Non-Motonicity

Depending on the rules of the OBCS, price schedules may or may not be monotonically decreasing. (The seller may want to raise his price if he gets too many bids, for example.) This requires the auction to determine what to do with buy offers submitted at a time when the price was lower, similar to the discussion immediately above.

In addition, there is a linking of seller flexibility and strength of commitment to buyers. If the seller has freedom to raise his prices and invalidate old offers, then buyers do not have the assurance of a strong commitment. The ability to raise prices arbitrarily also implies the ability for sellers to withdraw. Seller withdrawal or price raising could reduce buyer confidence in the OBCS in the same way that buyer withdrawal can reduce seller confidence.

What Information is Revealed to Buyers and Sellers Throughout the Buying Session:

Information on Quality of Goods

Buyers will want to know what they are buying so the market should include product reviews and descriptions and prices. In addition, information could be given on which products are selling well in the current buying session, as a way of letting buyers know what other buyers think of the goods.

Information on Prices

In order to make any purchasing decision buyers must know the current price of goods. Since this information is thus public, the, price list should be made directly available to sellers as well.

Information on Potential Prices

The seller's schedule, without quantities, is a list of potential prices which could attract buyers. In addition, the number of buyers needed to achieve further price decreases could be released. The potential price drop gives buyers an incentive to evangelize or raise their bids, as mentioned earlier.

Buyer to Buyer Communication

Buyers could send messages to each other. If buyers are also aware of the number of bidders needed to further lower the price, then this could be a way for buyers to cajole each other to lower their bids in concert.

Information on Schedules

Optionally, information on each seller's complete price schedule could be made available to buyers and/or sellers. For buyers, this is likely to be too much information to be useful. Sellers may also wish for there schedules to be kept in some measure of confidence for strategic reasons.

Information on Buyer Preferences

Aggregate information on which prices buyers are willing to pay could be released while the OBCS runs. It could also be released only after the system closes, or not at all.

Methods of Information Dispersal

In addition to the obvious queries, large changes to prices and current purchase quantity could be broadcast to participants through push technology.

How the System Closes a Buying Session

Multiple Rounds and Termination Conditions

The OBCS could go through multiple rounds of bid acceptance and price discovery, possibly discovering the price after every buyer bid. These would have to end eventually, either because a set time had elapsed, the system had received few new bids recently, or the seller's supply had been exhausted.

Excess Demand.

It is possible that the seller has a limited quantity of goods for sale and that there are enough buyers to more than exhaust that quantity. In this case, the OBCS reaction must be specified.

The OBCS could just stop receiving buy bids when it realizes that is has willing buyers for all available goods. Any buyers in the process of submitting a bid would be out of luck. If the system reserved a percentage of the goods and shut down when it had sold all but the reserve, then those buyers already submitting bids could still get their orders filled. The remainder of the reserves could then be distributed by auction or by lottery. A final way to deal with excess supply is for the late bids to take delayed delivery. This would need to be combined with one of the first mechanisms to cover the unusual cases where the seller cannot supply all of the demand even with an extended schedule.

The Mechanism in Detail—a Menu Tree

FIGS. 2–12 illustrate a tree-structured menu of choices for setting up a sale in the Buyers Club system.

Thus, a method and apparatus for facilitating the aggregation of buyer power in an on-line trading market system serving traders communicating via the Internet and similar networks is disclosed. Although the present invention has been described with reference to specific exemplary embodiments, it will be apparent to those of ordinary skill in the art that various modifications and augmentations may be made to these embodiments without departing from the broader spirit and scope of the present invention as set forth in the following claims.

We claim:

1. An on-line trading market system comprising:
    a seller interface to receive a dynamic pricing schedule from one or more sellers via a network;
    a buyer interface to receive a set of optional purchase terms from a plurality of buyers via the network; and
    a facilitator coupled with said seller interface and said buyer interface and configured to aggregate the set of optional purchase terms from said plurality of buyers to form an aggregated buyer purchase specification and to determine a best fit transaction based on the dynamic pricing schedule and the aggregated buyer purchase specification, at least one of the sellers to change the dynamic pricing schedule after the aggregated buyer purchase specification is formed, the changed pricing schedule to apply to the set of purchase terms retroactively.

2. The on-line trading market system as claimed in claim 1, wherein the best fit transaction is one, which maximizes quantity sold by the sellers and minimizes price paid by the buyers.

3. The on-line trading market system as claimed in claim 1, wherein the best fit transaction is one in which a highest volume offered by a seller is matched with a lowest price offered in the aggregated buyer purchase specification.

4. The on-line trading market system as claimed in claim 1, wherein at least one seller pricing schedule is disclosed to at least one buyer.

5. The on-line trading market system as claimed in claim 1, wherein said aggregated buyer purchase specification is disclosed to at least one buyer.

6. The on-line trading market system as claimed in claim 1, wherein said aggregated buyer purchase specification is disclosed to at least one buyer, and said aggregated buyer purchase specification includes a quantity of additional buyers needed to make a specific transaction a best fit transaction.

7. The on-line trading market system as claimed in claim 1, wherein a description of goods or services offered by a seller is disclosed to at least one buyer.

8. The on-line trading market system as claimed in claim 1, wherein a portion of the seller pricing schedule is disclosed to at least one buyer.

9. The on-line trading market system as claimed in claim 1, wherein at least one seller pricing schedule can be automatically modified based on the rate at which the facilitator receives buyer purchase terms.

10. The on-line trading market system as claimed in claim 1, wherein at least one seller pricing schedule is manually or automatically modified based on information received in at least one buyer purchase term.

11. The on-line trading market system as claimed in claim 1, wherein a plurality of seller pricing schedules include at least one competing good or service.

12. The on-line trading market system as claimed in claim 11, wherein at least one buyer previously committed to a particular seller is allowed to switch and commit to a different competing seller.

13. The on-line trading market system as claimed in claim 1, wherein the facilitator determines a quantity of sellers admitted to a buying session.

14. The on-line trading market system as claimed in claim 1, wherein the facilitator determines which of a plurality of sellers may participate in a buying session.

15. The on-line trading market system as claimed in claim 1, wherein at least one buyer purchase term includes a price above which the buyer will not accept a purchase in a specific transaction.

16. The on-line trading market system as claimed in claim 1, wherein at least one buyer is allowed to switch from a first seller to a different second seller based on a predefined price differential between the first seller and the second seller.

17. The on-line trading market system as claimed in claim, 1, wherein a message is sent from one buyer to another buyer in a buying session.

18. The on-line trading market system as claimed in claim 1, wherein a buying session is terminated upon exhaustion of seller's supply of goods or services.

19. The on-line trading market system as claimed in claim 1, wherein a buying session having a number of buyers greater than the available supply of goods or services is transacted using a buyer first come first served methodology.

20. The on-line trading market system as claimed in claim 1, wherein a buying session having a number of buyers greater than the available supply of goods or services is transacted using a lottery of buyers methodology.

21. The on-line trading market system as claimed in claim 1, wherein a buying session has a number of buyers greater than the available supply of goods or services, wherein the available supply of goods or services is partitioned into a first portion and a second portion, said first portion being distributed using a buyer first come first served methodology, said second portion being distributed using a lottery of buyers methodology after said first portion is exhausted.

22. The on-line trading market system as claimed in claim 1, wherein a buying session has a number of buyers greater than the available supply of goods or services, wherein the available supply of goods or services is partitioned into a first portion and a second portion, said first portion being distributed using a buyer first come first served methodology, said second portion being distributed using an auction methodology after said first portion is exhausted.

23. The on-line trading market system as claimed in claim 1, wherein at least one seller of said one or more sellers and said facilitator each represent the same organization.

24. The on-line trading market system as claimed in claim 1, wherein at least one seller pricing schedule is manually or automatically modified based on a lowered offered price on the pricing schedule of one of the one or more sellers.

25. An on-line trading market system comprising:
 a seller interface for receiving a dynamic pricing schedule from one or more sellers via a network;
 a buyer interface for receiving a set of optional purchase terms from a plurality of buyers via the network; and
 a facilitator coupled with said seller interface and said buyer interface and configured to aggregate the dynamic pricing schedule from said one or more sellers to form an aggregated seller pricing schedule and to determine a best fit transaction based on the set of optional purchase terms and the aggregated seller pricing schedule, at least one of the sellers to change the dynamic pricing schedule after receiving the set of optional purchase terms from the plurality of buyers via the network, the changed pricing schedule to apply to the set of purchase terms retroactively.

26. The on-line trading market system as claimed in claim 25, wherein multiple sellers aggregate a supply of goods or services to meet quantity requirements of at least one willing buyer.

27. The on-line trading market system as claimed in claim 25, wherein at least one buyer purchase term is disclosed to at least one seller.

28. The on-line trading market system as claimed in claim 25, wherein said aggregated seller pricing schedule is disclosed to at least one buyer.

29. The on-line trading market system as claimed in claim 25, wherein said aggregated seller pricing schedule is disclosed to at least one buyer, and said aggregated seller pricing schedule includes a quantity of additional sellers needed to make a specific transaction a best fit transaction.

30. The on-line trading market system as claimed in claim 25, wherein a description of goods or services required by a buyer is disclosed to at least one seller.

31. The on-line trading market system as claimed in claim 25, wherein a portion of the buyer purchase term is disclosed to at least one seller.

32. The on-line trading market system as claimed in claim 25, wherein at least one buyer purchase term can be automatically modified based on the rate at which the facilitator receives seller pricing schedules.

33. The on-line trading market system as claimed in claim 25, wherein at least one buyer purchase term is manually or automatically modified based on information received in at least one seller pricing schedule.

34. The on-line trading market system as claimed in claim 25, wherein a plurality of buyer purchase terms include at least one competing good or service.

35. The on-line trading market system as claimed in claim 25, wherein at least one seller previously committed to a particular buyer is allowed to switch and commit to a different competing buyer.

36. The on-line trading market system as claimed in claim 25, wherein the facilitator determines a quantity of buyers admitted to a selling session.

37. The on-line trading market system as claimed in claim 25, wherein the facilitator determines which of a plurality of buyers may participate in a buying session.

38. The on-line trading market system as claimed in claim 25, wherein at least one seller pricing schedule includes a price below which the seller will not accept a sale in a specific transaction.

39. The on-line trading market system as claimed in claim 25, wherein a message is sent from one seller to another seller in a selling session.

40. The on-line trading market system as claimed in claim 25, wherein a buying session is terminated upon exhaustion of buyer's requirement for goods or services.

41. The on-line trading market system as claimed in claim 25, wherein a buying session having a number of sellers greater than the available demand for goods or services is transacted using a seller first come first served methodology.

42. The on-line trading market system as claimed in claim 25, wherein a buying session having a number of sellers greater than the available demand for goods or services is transacted using a lottery of sellers methodology.

43. The on-line trading market system as claimed in claim 25, wherein a buying session has a number of sellers greater than the available demand for goods or services, wherein the available demand for goods or services is partitioned into a first portion and a second portion, said first portion being satisfied using a seller first come first served methodology, said second portion being satisfied using a lottery of sellers methodology after said first portion is satisfied.

44. The on-line trading market system as claimed in claim 25, wherein a buying session has a number of sellers greater than the available demand for goods or services, wherein the available demand for goods or services is partitioned into a first portion and a second portion, said first portion being satisfied using a seller first come first served methodology, said second portion being satisfied using an auction methodology after said first portion is satisfied.

45. The on-line trading market system as claimed in claim 25, wherein at least one buyer purchase specification is manually or automatically modified based on a lowered offered price on the pricing schedule of one of the one or more sellers.

\* \* \* \* \*